United States Patent [19]
Foresman et al.

[11] Patent Number: 5,099,422
[45] Date of Patent: Mar. 24, 1992

[54] COMPILING SYSTEM AND METHOD OF PRODUCING INDIVIDUALLY CUSTOMIZED RECORDING MEDIA

[75] Inventors: R. Scott Foresman, La Jolla; Michael G. Slade, San Francisco; John M. Moscicki, La Jolla, all of Calif.; Kathleen B. Keilty, Minneapolis, Minn.; Terence P. Shek, San Francisco, Calif.

[73] Assignee: Datavision Technologies Corporation (formerly Excnet Corporation), San Francisco, Calif.

[21] Appl. No.: 324,896

[22] Filed: Mar. 17, 1989

Related U.S. Application Data

[63] Continuation-in-part of Ser. No. 850,239, Apr. 10, 1986, Pat. No. 4,863,384.

[51] Int. Cl.⁵ .................. G06F 15/22; G06F 15/24
[52] U.S. Cl. .................................. 364/401; 358/84; 358/86; 358/903; 360/14.1
[58] Field of Search ............... 358/342, 341, 335, 84, 358/86, 142, 903; 364/401; 434/308; 360/72.1, 72.2, 14.1

[56] References Cited

U.S. PATENT DOCUMENTS

| | | | |
|---|---|---|---|
| 4,602,279 | 7/1986 | Freeman | 358/142 X |
| 4,724,491 | 2/1988 | Lambert | 360/14.1 X |
| 4,725,977 | 2/1988 | Izumi et al. | 364/900 |
| 4,745,549 | 5/1988 | Hashimoto | 358/84 X |
| 4,775,935 | 10/1988 | Yourick | 364/401 |
| 4,863,384 | 9/1989 | Slade | 434/107 |
| 4,905,094 | 2/1990 | Pocock et al. | 358/86 X |
| 4,918,516 | 4/1990 | Freeman | 358/86 |
| 4,924,303 | 5/1990 | Brandon et al. | 358/86 |
| 4,941,040 | 7/1990 | Pocock et al. | 358/86 |

Primary Examiner—Dale M. Shaw
Assistant Examiner—Laura Brutman
Attorney, Agent, or Firm—Bernard L. Kleinke; Jerry R. Potts; William P. Waters

[57] ABSTRACT

The compiling system and method of the present invention enables the recording of individually customized information onto blank storage media devices, and includes a data base memory device for storing information signals indicative of customized recipient information pertaining to a group of recipients. A presentation memory device stores a group of pre-recorded signals indicative of a group of information segments to be compiled selectively. A computing device responds to stored information signals indicative of customized recipient information for selecting certain ones of said pre-recorded signals indicative of certain ones of said segments and for causing signals indicative of certain ones of said segments to be retrieved selectively in a given sequence for compilation purposes. A recording device responds to retrieved signals indicative of certain ones of said segments for storing said retrieved signals onto individual ones of the storage media devices.

35 Claims, 10 Drawing Sheets

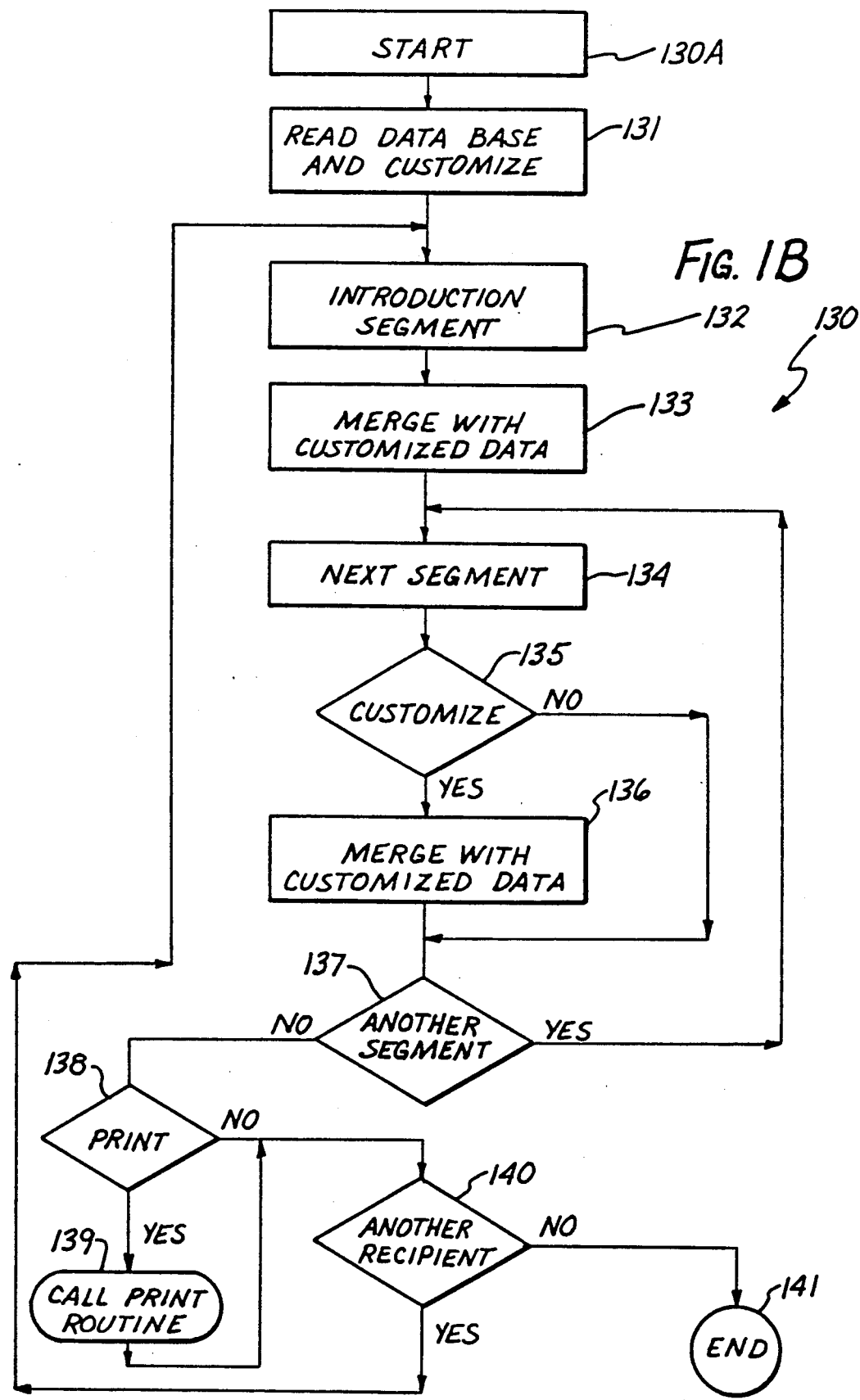

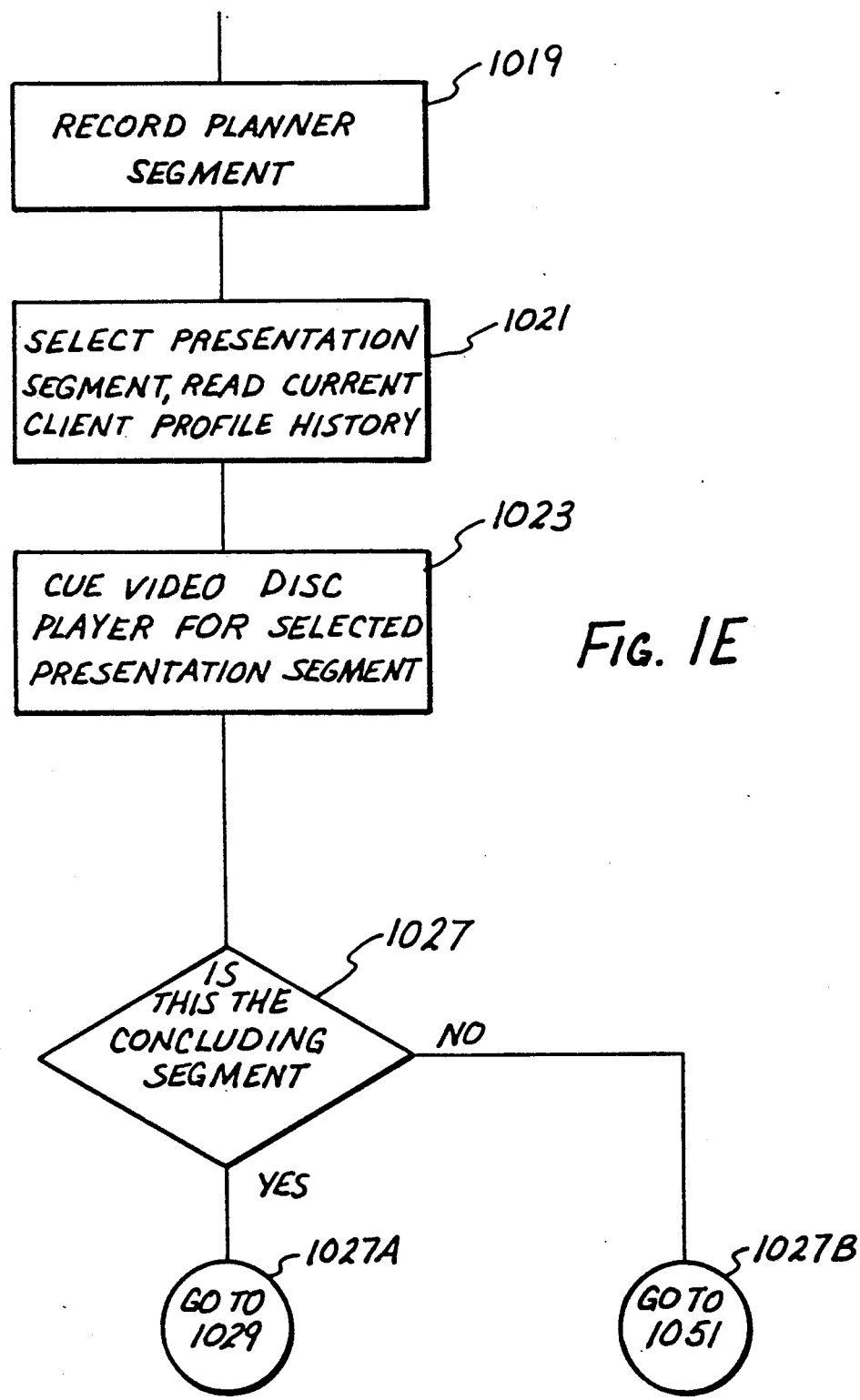

COMPILING SYSTEM AND METHOD OF PRODUCING INDIVIDUALLY CUSTOMIZED RECORDING MEDIA

CROSS REFERENCE TO RELATED APPLICATION

This application is a continuation-in-part application of co-pending U.S. Pat. application of Michael G. Slade, Ser. No. 06/850,239, filed April 10, 1986, now U.S. Pat. No. 4,863,384, entitled "Personalized Feedback System Utilizing Pre-Recorded Media and Method of Making Same."

TECHNICAL FIELD

This invention relates generally to compiling systems, and methods of producing individually customized recording media. More particularly, this invention relates to a compiling system that facilitates the compiling of individually customized recording media for presentation to an individual, or to a group of recipients.

BACKGROUND ART

Essential to the success of any given business or organization is its ability to target a communication to a selected segment of the public having a certain requirement or need for the products and/or services being offered or supplied by the particular organization in question. By communicating effectively with such selected individuals or groups of individuals, the organization can be reasonably assured of growth and success, and in general, of more effective and efficient dealing with others in the furtherance of its goals.

The targeting of the communication is accomplished by qualifying selected individuals or groups of individuals within the general public having a requirement or need for any given product or service. Due to the diversity that exists within the public, various different types and kinds of qualification factors are employed. For example, age, education, income and other demographic qualification factors are commonly used for helping to target communications from organizations.

In order to effectively qualify individuals for particular products or services, numerous data sources have been developed for helping a business or other organization target its marketing or advertising efforts. For example, organizations establish data bases which may be representative of individuals who have utilized certain products or service in the past. Similarly, the organizations conduct surveys to develop customer intelligence information from interviews and telephone solicitations. Related data is also obtained from other sources such as zip code-based address market data services, government motor vehicle listings, or even from analyzing customer transaction data, such as the purchasing habits of a credit card holder.

It would be highly desirable to have a method and apparatus for using targeting information in an even more effective and novel manner. In this regard, it would be useful and desirable to have new and improved techniques for producing dramatically new, individually customized forms of communication. Such forms of communication should be directed to each individual recipient of such communication. Such communication should be focused to the recipient's own requirements, needs or idiosyncracies, to produce individually customized communications relating to specific ones of products and/or services for individuals or groups of individuals.

Such novel and dramatically new form of communication should be an individually customized communication suitable for convenient delivery to, and use by, the targeted recipient. If desired, large numbers of such communications should be able to be mass produced in large numbers for distribution to the targeted segment of the public, and yet each such mass produced communication should be individually customized to each individual recipient. In this regard, each individual communication should be compiled of a plurality or series of segments selected to the idiosyncaracies of tis intended individual recipient. Such technique should be relatively inexpensive to mass produce and to distribute.

DISCLOSURE OF INVENTION

Therefore, the principal object of the present invention is to provide a new and improved compiling system and method for producing individually customized communications for a group of recipients in a relatively inexpensive manner.

It is yet another object of the present invention to use such a new and improved inventive system and method to record compiled and customized recipient information on a storage media device such as a videotape cassette.

It is yet another object of the present invention to use such a new and improved inventive system and method to print customized printed material, such as solicitation letters, mailing labels and the like, to accompany and/or precede the compiled customized recording media produced by the process of the present invention.

Briefly, the above and further objects of the present invention are realized by providing a new and improved compiling system and method for producing customized communications, which are each individually customized and which relate to each individual recipient.

The compiling system and method of the present invention enables the recording of individually customized information onto blank storage media devices, and includes a data base memory device for storing information signals indicative of customized recipient information pertaining to a group of recipients. A presentation memory device stores a group of pre-recorded signals indicative of a group of information segments to be compiled selectively. A computing device responds to stored information signals indicative of customized recipient information for selecting certain ones of said pre-recorded signals indicative of certain ones of said segments and for causing signals indicative of certain ones of said segments to be retrieved selectively in a given sequence for compilation purposes. A recording device responds to retrieved signals indicative of certain ones of said segments for storing said retrieved signals onto individual ones of the storage media devices.

In one form of the invention, the system employs a video/audio recording arrangement, to enable a recipient to receive a customized videotape for playing on a conventional videotape player. A customized recipient data base consisting of information pertaining to a segment of the general public, is accessed and compiled according to certain predetermined selection criteria under the control of the computing device.

The storage media devices store a group of prerecorded audio and video signals, which are indicative of segments illustrative of product, service, and/or recommendation information for presentation to a recipient. The storage media devices store retrieved signals indicative of certain ones of the segments to provide a presentation of information customized for an individual recipient.

In order to manufacture the storage media devices in one form of the invention, the computing device causes the recording device to store the selectively compiled and sequenced segments onto the storage media devices. In this manner, individually customized storage media devices can be mass produced, and each one is different from one another. In this regard, each one is customized for individual recipients of the storage media devices, to provide a dramatic new form of communication to targeted recipients.

In another form of the invention, the computing device causes a printer to print indicia, which corresponds to individual ones of the storage media devices. In this regard, the printed indicia may, for example, be used to identify the storage media.

Thus, the system of this invention provides a new and improved compiling system which enables individually customized storage media devices, such as video cassette tapes, audio tapes, or other such devices, to be mass produced at relatively low cost for distribution to targeted recipients. Each media device contains prerecorded information segments selected to match the individual recipient's idiosyncracies, such as his or her needs and/or requirements. Such a customized storage media can be utilized by the recipient, on widely available conventional videocassette recorders and television receivers.

BRIEF DESCRIPTION OF DRAWINGS

The above mentioned and other objects and features of this invention and the manner of attaining them will become apparent, and the invention itself will be best understood by reference to the following description of the embodiments of the invention in conjunction with the accompanying drawings, wherein:

FIGS. 1B-1H are flow chart diagrams illustrating a computer program stored in the computer of the system of FIG. 1, to control the sequence of making the prerecorded storage media devices;

BEST MODE FOR CARRYING OUT THE INVENTION

The detailed description that follows is organized according to the following outline:
A. GENERAL DESCRIPTION OF SYSTEM FOR COMPILING CUSTOMIZED RECORDING MEDIA
B. DETAILED HARDWARE DESCRIPTION
C. SYSTEM SOFTWARE
D. MULTIPLE MEDIA PRODUCTION SYSTEM
E. TAPE PRODUCTION UNIT

A. GENERAL DESCRIPTION OF SYSTEM FOR COMPILING CUSTOMIZED RECORDING MEDIA

Figure 1:
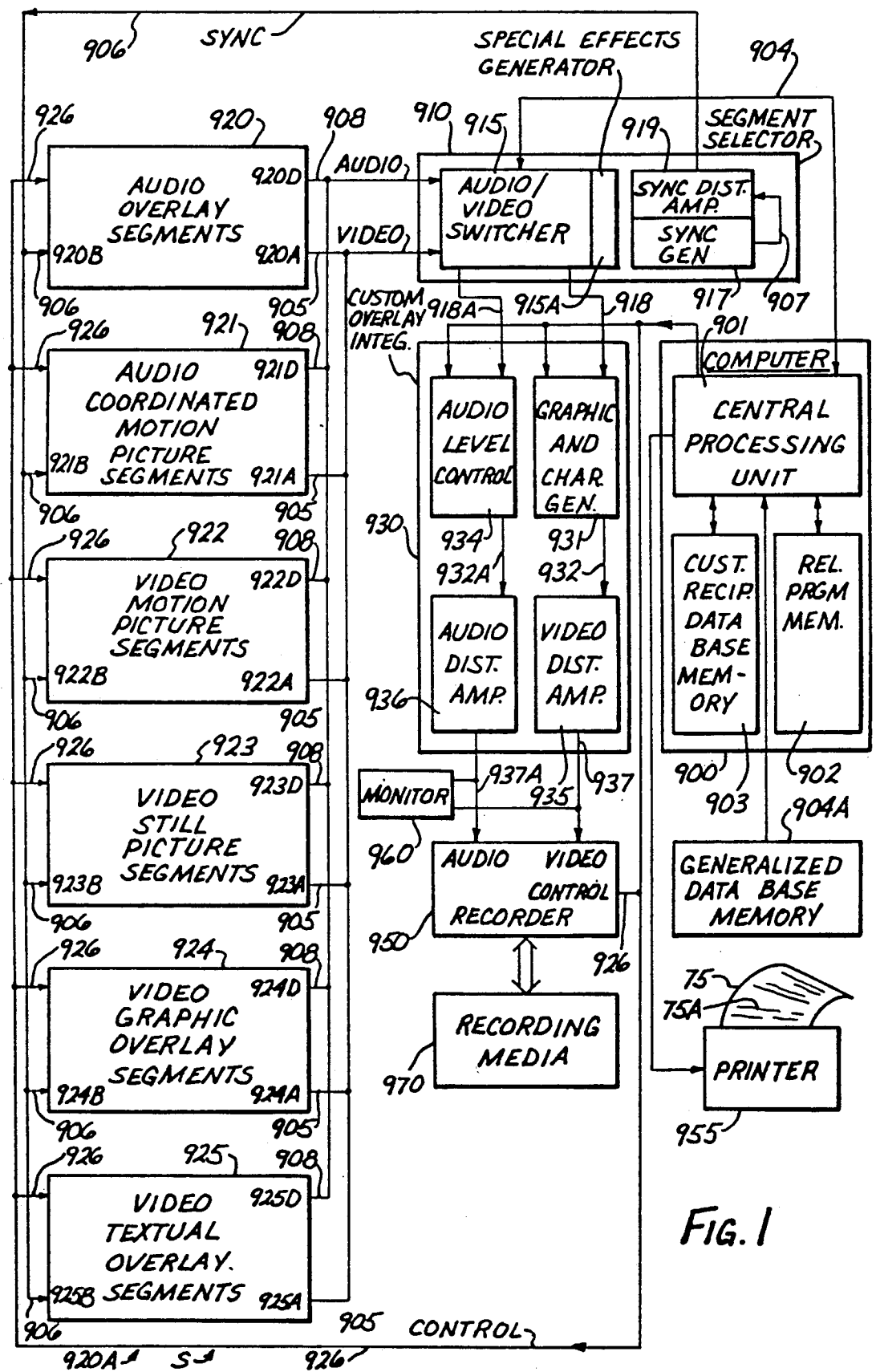
FIG. 1 is a detailed block diagram of a compiling system constructed in accordance with the present invention.

Referring now to the drawings, and more particularly to FIG. 1, there is shown a compiling system S, which is constructed according to the present invention. The system S includes a recorder 950, such as a videocassette recorder, and is able to produce individually customized recording media 970, such as a series of videocassette tapes, for distribution to a series of recipients. Each tape is thus provided with a compiled group of recorded segments related to suit the needs and requirements of individual persons who will receive and view the material recorded on his or her tape.

A computer 900 accesses computer readable generalized data base information signals indicative of a compilation of recipient or customer information stored in a generalized data base memory 904A. Such recipient information includes a compilation or listing of information relating to a group of recipients concerning their individual idiosyncracies, and other information, such as their names and addresses. Storage or memory devices such as a group of video disc players generally indicated at 920A, store a group of pre-recorded audio and video signals indicative of a group of audio and video segments to be compiled selectively in a customized manner for an individual recipient in accordance with the information stored in the generalized data bas memory 904A. The audio and video segments can be various different audio overlay segments, audio coordinated motion picture segments, video motion picture segments, video still picture segments, video graphics overlay segments, and video textual overlay segments, each being stored in individual ones of the respective records 920 through 925.

The generalized data base memory 904A is accessed by the computer 900 and only certain relevant information stored therein is retrieved and stored in a customized recipient data base memory 903. In this regard, for example, only certain items of information are retrieved from the generalized data base memory, and such items may include the names and addresses of the recipients, and only certain other items of information. Such other items may include their preferences, past spending habits, their likes and dislikes, and others.

The generalized data may be required from a company desiring to communicate with their customers, and the generalized data may include many different types and kinds of information relating to the customers. The generalized data may be stored on any convenient computer readable media such as floppy disc, computer readable survey forms with pencil or ink notations thereon, laser discs and the like.

The computer 900, responding to the customized information stored in the memory 903, selects only certain ones of the information segments from the memory devices or players 920A. A relational operation program stored in a relational program memory 902 of the computer 900 controls the computer 900 to cause certain items of information to be retrieved from the customized memory 903 for determining which segments and in what order, they are to be recorded onto the recording media 970, such as a videocassette via a recorder 950. In this regard, signals indicative of certain ones of the pre-recorded audio/video segments are retrieved selectively in a given sequence, including correlation, sequence overlay, selection, and sequencing.

Under the control of the computer 900, pre-recorded information segments stored in the memory devices or recorders 920A are selectively retrieved and compiled in the desired sequence for recording on the blank storage media device 970 during the production of individually customized storage media devices, such as videocassettes. The customized videotaped presentation incorporates a compilation of certain selections retrieved from the generalized data base information, together with selected ones of the pre-recorded audio and video segments. In this regard, the videocassette, after being custom recorded, can be played back on a videocassette recorder (not shown) used by the recipient. In this manner, based on certain recipient information, certain audio and video segments and overlaid segments, are computed and recorded onto a videocassette for a given recipient. Thus, the custom recorded videocassette can be used for presenting packaged information, such as information regarding products, services, and recommendations in a customized manner.

Once the customized information has been compiled on the videotape or other recording media, the recorded storage media device 970 may be delivered to a recipient for use on any available countable play-back device, such as a videocassette recorder or player (not shown). Thus, an individual recipient is able to view and/or read a presentation, which is customized to achieve maximum recipient interest in the presentation, as well as the recipient's acceptance of the presented product, service and/or recommendation.

Considering now the operation of the system S of the present invention in greater detail, the operation causes the preparation of individualized customized recording media devices from a content library stored in the players 920A.

Considering now the operation of the compiling system S and more particularly how individual recording media, such as recording media 970 are coupled and recorded.

After the computer 901 accesses the generalized data base it stores the raw data derived therefrom in the customized recipient data base memory 903. A program stored in the relational memory 902 causes the computer 901 to select a profile of segment information stored in the players 920A that would relate to each recipient. This program also causes the computer 901 to sequence the selected profile of segment information stored in the players 920 in a particular sequence for each recipient.

Once the profile selection and sequencing is accomplished, the program stored in the relational program memory causes the computer 901 to compile selected portions of the raw data stored in the customized recipient data base memory 903 with the selected profile information. More particularly, as each sequenced profile segment is read from a selected player, the computer will copy and store the segment, merge the segment with a selected raw data portion if appropriate, to structure a segment for recording and then causing the recorder to record the compiled structured segments on the individual recording media, such as recording media 920. This method of operation is repeated for each individual recipient, thus the system in operation compiles and records a group of individual recording media where each recording media is customized for an individual recipient.

The media devices in the form of videocassettes as recorded under computer assistance, are based on the unique needs, desires and idiosyncracies of each recipient. The specific operation and content of each presentation group is based on a consultative process that analyzes information from the generalized data base memory, containing information unique to each recipient. Such information includes very simple information, such as the recipient's name only, as well as highly complex information with individualization schemes determined individually for each use of the resulting custom recorded videocassette. Once the generalized information stored in the memory 904A has been analyzed by the computer 900, information is compiled or translated into a profile for determining what information content with respect to products, services, recommendations, and other visual, graphic, audio, or textual matters will be delivered to each individual recipient.

After the information segments stored in the players 920A in the form of a profile of information content has been developed for a group of recipients, the computer 900 is controlled by a program, which determines what specific presentations and sequencing of this information would be most effective for a given individual recipient. In this regard, the program has algorithms embodying formulae or rules to determine which recipient receives which information segments. The computer 900 then causes the compilation of the customized information, and assembles the information onto an appropriate individual recording media 970 for distribution to the recipient who then can utilize the media 970 on his or her own play-back device (not shown).

Considering now the generalized information source from where the recipient information may be gathered in greater detail, the generalized recipient information can be obtained from whatever source is most appropriate for the presentation application.

For example, information sources may include prospect lists developed from public sources such as a voter's registration list. Also, such sources may include a customer list including names and addresses, as well as more complex information such as age, sex, income, education, and location demographics with past purchasing histories. Other sources may include customer intelligence developed from interviews, initial telephone solicitations, appending related data (such as from address zip code-based market data services or government motor vehicle lists) or analysis of customer transaction data such as a customer's purchasing habits. The generalized information may also be developed from response or survey cards where a prospective recipient provides a written response to questions.

Considering now in greater detail the customized recipient data base information stored in the memory 903, as developed from the above mentioned generalized information sources with little or no interpretation, calculations or associated conclusions as related to a specific recipient, such customized information is raw information, which may include the recipient's name, address, state, address, zip code, and telephone number. Additionally, the customized information may include demographics pertaining to the recipients such as age, sex, income, education, etc. Also, such information may include past activities of the recipients such as purchase of particular products, amounts spent in particular product categories, overall expenditure levels, etc. and the like. Moreover, there may be included the recipient attitudes and behavior such as lifestyle, travel, interests, hobbies, etc. and others.

Other customized information may include the recipient preferences related to particular product benefits or product categories such as risk level and liquidity for financial products, quality and purchase price of consumer products, and the like. Similar information may also include specific recipient requests for information on a particular product or a related topics such as might be "checked" on a reader response card.

Considering now the segment information stored in the players 920A, the segment information is in the form of information relating to products, services, and recommendations.

Considering now the selection of the information stored in the players 920A for presentation to an individual recipient, the computer 901 in response to the program stored in the relational program memory 902 selects certain segment information for presentation to individual recipients. The selection is based on a set of conclusions about what information should be included on a particular recipient's presentation tape and is controlled by a set of decisional rules applied to the raw data stored in the memory 93. It should be understood that profile includes a completion of information that can include specific products, services or recommendation segments stored in the players based upon recipient segmentation, categories of products, services or recommendations where either the data or knowledge of their benefits as related to specific recipients is not complete enough to releasably select a specific segment from the players 920A for presentation to a recipient, or similar scheme, for selecting a particular product, service or recommendation whose benefits best match each individual recipient's needs based upon their unique raw data stored int eh customized recipient data base memory 903.

Considering now the presentation and sequencing in grater detail, presentation and sequencing of the information stored in the players 920A requires conclusions about what specific audio/video segments are to be presented and in what specific order. These conclusions are developed by the program stored in the relational program memory 902 and includes a set of decisional rules that are applied to each recipient's raw data store in memory 903, and the PSR identified in the profile. The relational program stored in the relational program memory 902 utilizes its algorithm to determine what particular presentation of a PSR would be most effective for that recipient, and what order of presentation would be most effective for that recipient. In structuring the presentation and sequencing the algorithm or program stored in memory 902 considers: previous recipient experience, if any that would enable the selected audio/video segment stored int eh players 920A to be more effective; positioning factors, such as age, education, etc. of the recipient that influence the vocabulary, tone, or even the specific features that are included in the selected segments; and interaction information, that influence the sequencing, specific message such as reference to a previously presented product, service or recommendation made to a recipient on the presentation media or elimination (e.g. not presenting all segments if too may are selected in the profile) of all possible segments.

Considering now the process of recording onto individual ones of the recording media 970 in greater detail, the assembly of the recording media 970 can be accomplished through a variety of methods to achieve a full audio/video presentation, audio only, or video only, and possibly with accompanying written or printed media. These include the present inventive system which extends to full audio/video assembly, audio only, and written/printed media assembly.

Considering now the application of the present inventive process to a few compiling examples:

1. Compiling a Customizing a Recording Media with the Recipient's Name as the Only Variable

TABLE A

| | |
|---|---|
| Data Source (Memory 904A): | Prospect List |
| Raw Data (Memory 903): | First & Last Name |
| Profile (Players 920A): | Name Test |
| Segment Presentation/ Sequencing (Memory 902): | One Possibility Only (Not Variable) |
| Compiling segments/ Raw Data: | Name Overlaid in Introduction (only variable) |

2. A Compiled Customized Direct Mail Solicitation With Minimal Customization

TABLE B

| | |
|---|---|
| Data Source (Memory 904A) | Credit Cardholder File |
| Raw Data (Memory 903) | First & Last Name Type of Card Membership Date |
| Profile | Name Text Membership Data Text Card Type Text |
| Segment Presentation/ Sequencing (Memory 902) | Same Sequence for All (Not Variable) Variable Video Segment - based on Card Type (First Variable) Variable Audio Segment - based on Member Date (Second Variable) |
| Compiling Segments/ Raw Data | Name Overlaid in Introduction (Third Variable) Customized Video/Audio Segments |

3. A Compiled Cross-Product Sale—Direct Mail Solicitation to Customer who Purchased Product A with Recommendation to Purchase Follow On Product B.

TABLE C

| | |
|---|---|
| Data Source (Memory 904A) | Customer File |
| Raw Data (Memory 903) | First & Last Name Age/Sex Previously Purchased Product |
| Profile (Players 920A) | Selection of most relevant benefits of "Product B" |
| Segment Presentation/ Sequencing (Memory 902) | Descending order of importance to each customer type (First Variable) |
| Compiled Segment/Raw Data | Name Overlaid in Introduction (Second Variable) Customized Audio/Video Segments (Third Variable) Benefit 1 segment Benefit 2 segment Benefit L segment Response Instruction Overlaid at Conclusion (Fourth Variable) |

From the foregoing, it would be obvious to one skilled in the art that the present inventive process and system have a wide range of applications. Table D is a summary of a few applications to which the present inventive system and method would apply.

TABLE D

| Applications | Examples | | |
| --- | --- | --- | --- |
| Marketing Applications | Solicitation | Response | Product Positioning |
| Product Presentation Application | Financial Plan | Benefit of Product | Benefit of Service |
| Training Application | Competitive Product Comparison | — | — |
| Coaching Application | Sports Instructions | Health/Diet Instructions | — |
| Interpretation and Expertise Application | Selecting Relevant Expert Recommendations | Interpretation Test Results | — |
| Information Selection and Focusing | College Catalog | Product Catalog | Service Catalog |

Considering the compiling system S in grater detail, illustrated in FIG. 1. More particularly, the compiling system S employs a computer generally indicated at 900, such as the model sold by IBM Corporation of NY, under the trade name "IBM PC/XT." It will become apparent to those skilled in the art that other types and kinds of computers may also be employed in accordance with the present invention.

The computer 900 includes a microprocessor unit 901, a relational program memory unit 902, and a customized recipient data base memory 903.

The compiling system S also includes a segment selector 910 that operates with a series of videodisc players 920-925 and a customizing overlay integrator 930 to enable computer-control selection of pre-recorded signals stored on a series of videodiscs (not shown). The videodisc players 920-925 may be Sony LDP-2000-3 videodisc players. The segment selector 910 includes a audio/video switcher 915.

The videotape recorder 950 may be a conventional ½ inch recorder capable of producing a videocassette that is compatible with conventional home videocassette recording equipment. The audio-video monitor 960 may be a Sony PVM-1271Q audio-video monitor.

The components of the system S are interconnected generally as indicated in FIG. 1, and used with suitable programming to produce the recording media 970. The compiling system selects and plays back audio/video segments; graphics, music, narration from the player 920A, and special effects from the audio/video switcher 915. Additionally, the program operating with the data computer 900 merges or integrates data base information as part of the presentation to create either or both a recording media having customized information sequenced for audio-visual display purposes, or a media with printed indicia thereon having customized information sequenced and integrated with recipient information.

B. DETAILED HARDWARE DESCRIPTION

Considering the compiling system S in still greater detail, the system S includes the computer 900 which is interconnected to the segment selector 910, the videodisc players 920-925, the customized overlay integrator 930, the recorder 950, and the printer 955.

The videodisc players illustrated in FIG. 1 are interconnected in a "daisy chain" manner by suitable cables, shown generally as cable means 926 via a group of IEEE-488 ports (not shown). However, it is to be understood that other conventional local area networking techniques may also be employed. Cable means 926 is also connected to the personal computer 900.

The printer 955 illustrated in FIG. 1 is connected to the computer 900 by a cable shown at 955A. In this manner, the computer 900 is able to control the printer 955 and to print indicia 75A on media, such as recording media 75 illustrated schematically in FIG. 1. The recording media is preferably a videocassette, but it is to be understood that other types and kinds of recording media, such as audiocassettes, laser discs, and others, may also be employed. The storage media 970 may be played back on a play back device (not shown), such as a conventional video cassette recorder and a television receiver (not shown). It should, of course, be understood that various different kinds of such recorders, including high definition video cassette recorders and television receivers, may also be employed.

The discs of the players store audio overlay segments, audio coordinated motion picture segments, video motion picture segments, video still picture segments, video graphic overlay segments, and video textual overlay segments. In order to access these information segments selectively, messages are sent from the computer 900 to selected ones of the players. The messages typically include a search command for beginning and terminating frames. In this manner, one player can be caused to play back a segment, and then the next player can be placed in a ready state on a cue.

The segment selector 910 includes an RS-232C port (not shown) which is interconnected by a suitable cable means illustrated by line 904 to a corresponding RS-232C port (not shown) in the personal computer 900.

In addition, videotape recorder 950 is interconnected by cable means 905 to a parallel card (not shown) in computer 900.

Interconnected in this manner, the IEEE-488 ports and IEEE-488 card (not shown) in the computer 900 may be used to exercise control over the videodisc players 920-925. Using this configuration, it is possible to control from one up to fifteen videodisc players with one IEEE-488 card. Six videodisc players are shown for illustration only. The actual number of videodisc players used may be increased according to the number of source videodiscs needed to produce a specific customized videotape sequence. A fewer number of videodisc players may also be employed.

Considering now the interconnecting of the video portion of the compiling system S with reference to FIG. 1, each of the videodisc players 920-925 also includes a video output, ports 920A-925A. These video outputs 920A-925A are interconnected by suitable cable means 905 to the segment selector 910 and more particularly to the audio/video switcher 915 of the segment selector 910. The audio/video switcher 915 includes an internal audio/video switcher 915A.

Each one of the videodisc players 920-925 also includes a synchronizing input port, sync ports 920B-925B. These sync inputs 920B-925B are interconnected by a suitable cable 906 to the segment selector 910 and more particularly, to a sync distribution amplifier 919 which is interconnected to a sync generator 917 via a cable at 907.

Considering now the interconnecting of the synchronizing portion of the coupling system S with reference to FIG. 1, the sync generator 917 is interconnected by suitable cables illustrated at 907A to the audio/video switcher 915, to provide a video black signal to the audio/video switcher 915. A selected video from a selected one of the video outputs 920A-925A and 907, is coupled from the audio/video switcher 915 by a suitable cable illustrated at 918 to the customizing overlay integrator 930, and more particularly to its graphics and character generator 931.

The output from the graphics and character generator 931 is transmitted by cable 932 to the video input of a video distribution amplifier 935. The output from the video distribution amplifier 935 is transmitted by a suitable cable 937 to the video input of recorder 950. Recorder 950, in turn, records the video signal on a suitable medium such as the conventional videocassette 970.

The output of the video distribution amplifier 935 is also coupled via a cable 937, to the video input of the composite audio/video monitor 960 where video signal quality can be monitored.

The segment selector employs three modes of operation: a video straight through mode from the videodisc players 920-925, a customized overlay mode driven by the computer 900, and a computer graphics mode also driven by the computer 900.

In order to cause a visually uninterrupted flow between video segments, all of the major components are synchronized by the sync generator 917. Thus, all of the frames of information stored on the disc of the various disc players, are played back in synchronism.

For continuous presentation, the segment selector 910 receives a switch command from the computer 900 to request the next player to come on line. However, the command is executed only upon the coincidence of the vertical blanking interval signals generated internally by the segment selector 910. Thus, the switching from one videodisc player to the next, occurs during the vertical blanking interval.

Considering now the interconnecting of the audio portion of the compiling system S with reference to FIG. 1, the videodisc players 920-925 include audio output ports 920D-925D. These audio output ports 920D-925D are interconnected by a suitable cable 908 to the segment selector 910, and more particularly, to the special efforts generator 915 of the segment selector 910.

An audio output port 915B from the audio/video switcher 915 is interconnected by a cable 918A to the customizing overlay integrator 930, and more particularly, to its audio level control portion 934. The output from the audio level control 934 is transmitted via a cable 932A to the audio input of an audio distribution amplifier 936. The output from the audio distribution amplifier 936 is transmitted via a cable 937A to the audio input of the recorder 950. Recorder 950, in turn, records the audio signal on a suitable medium, such as a track of the conventional videocassette 970.

The output of the audio distribution amplifier is also connected via a cable 937A to the audio input of the composite audio/video monitor 960 where audio signal quality can be monitored.

The segment selector 910 also employs three audio modes of operation. They comprise an audio straight through mode from the videodisc players, an overlay mode from the computer, and a computer audio only mode from the computer. These modes of operation are synchronized and control in a manner similar to the video portion of the segment selector and will not be described hereinafter in greater detail.

Considering now the relational memory program 130 with reference to FIG. 1B, the program 130 controls the presentation sequence or format of the information recorded onto the recording media 970 or the indicia 75A printed on the media 75. The program begins at 130A and advances to 131 where the generalized data base file is analyzed and customized. This enables the system to analyze the data and to select the presentation segments to be used. The presentation then proceeds with selecting an introduction for a recording on the cassette 970 as indicated at step 132 of FIG. IB. The introduction segment is then copied and merged with the recipient or customized data as indicated at step 133.

As the introduction segment is being recorded, the next segment is cued as indicated at step 134. The presentation advances to step 135 to determine whether the customized information is to be overlaid or merged with the next sequence. If the segment is to be customized the customized data is merged with the segment and recorded as indicated at step 136. If the segment is not to be customized, the program proceeds directly to step 137. At step 137, the program determines whether another segment is to be recorded. If so, the program returns to step 134 to cue another segment. If no additional segments are required, the program advances to step 138. If the sequenced and or customized data is to be printed, the program advances from step 138 to step 139 which calls the print routine. After the material has been printed the program goes to step 140 to determine if another recipient tape is to be produced. If other tapes are to be produced, the program returns to box 132 and repeats the process described. If no additional tapes are to be produced, the program goes to step 141 and ends the production sequence.

C. COMPUTER SOFTWARE

Referring now to FIGS. 1C-1I, there is shown detailed flow charts of a generalized computer program for producing compiled customized recording media and associated customized media with indicia thereon. The flow charts of FIG. 1C-1H further define each one of the steps 130 to 141 of FIG. 1B. The software is stored in the personal computer 900 of the compiling system S.

The presentation sequence or format of the information recorded onto the recording media 970, is controlled by the computer program 1000 stored on the floppy disc (not shown), and as illustrated in FIGS. 1C-1I.

Figure 1C:
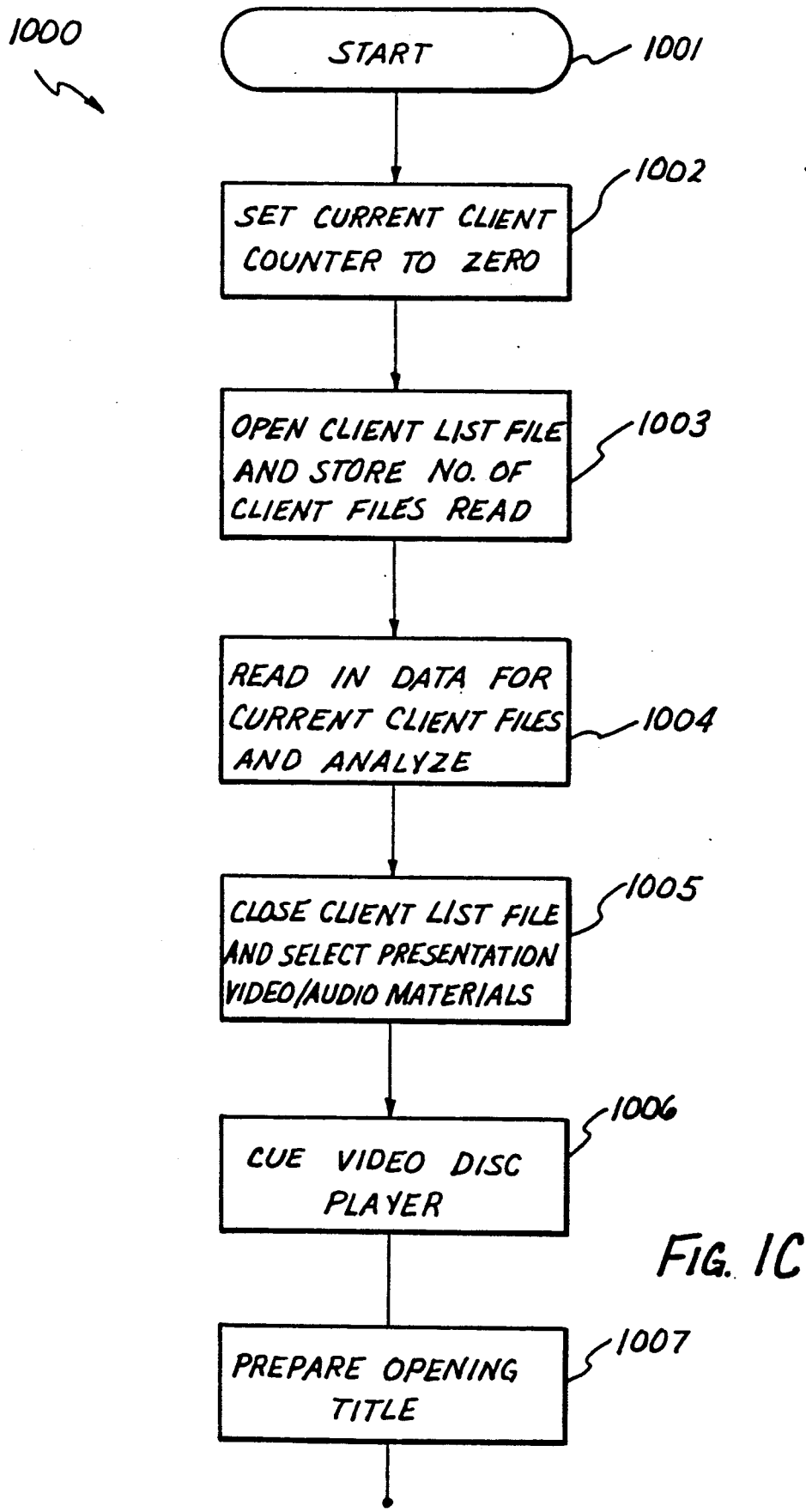

As indicated in FIG. 1C, the program begins at 1001 and proceeds to action box 1002 where a current client counter is set to zero. The program then proceeds to box 1003 to open a client file list and causes the computer 900 to store the number of current client files stored on the floppy disc to determine how many recording media will be produced. The file number is retained by the program and is compared against the current client counter for an equivalence. The program then reads, analyzes and stores selected current client profile histories as indicated at box 1004. The client list file is then closed in box 1005 which enables the system to review the customer profile history to select the presentation elements to be used for that particular client. The program then proceeds to box 1006 and cues the videodisc player to be used with this client. Once the videodisc player is cued, the program proceeds with preparing the opening title and causing an introduction to be prepared for recording on the cassette 80, as indicated at box 1007.

Figure 1D:
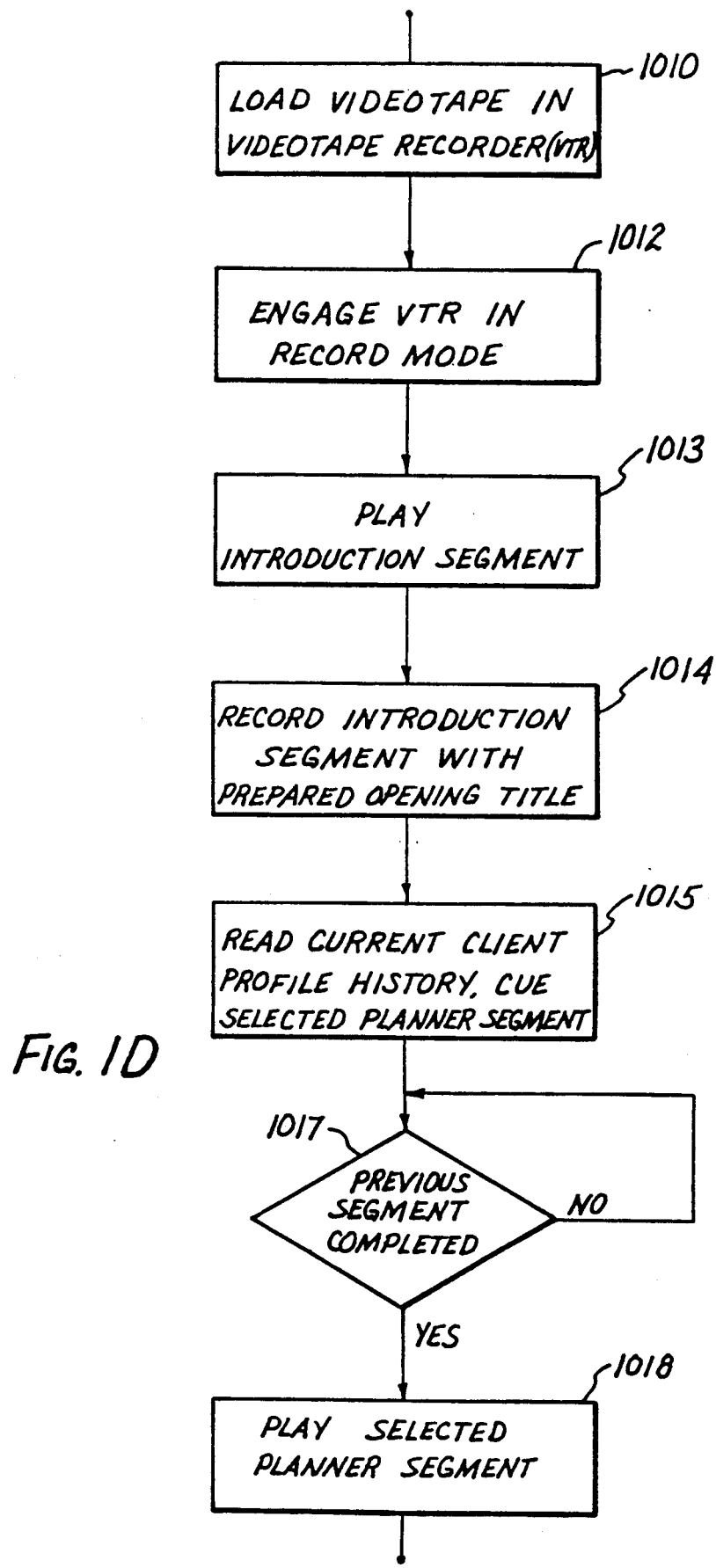

Referring now to FIG. 1D, the program then causes the recorder to be loaded with a blank tape as indicated at box 1010. The program proceeds to box 1012 once the recorder 950 has been loaded and engages the recorder 950 in the record mode. When the recorder 950 has been engaged in the record mode the program proceeds with the process of playing the selected introduction segment from one of the videodisc players, and recording or copying that segment on the recording media with the prepared opening title as indicated in boxes 1013, and 1014.

As the introduction segment is being recorded, the program also reads the current client profile history, selects the appropriate presentation or planner segment, and cues the selected presentation or planner segment from one of the videodisc players also as indicated in box 1015.

The program then proceeds to decision box 1017 to wait for the previous audio/video segment (introduction segment) to end. If the segment has ended, the program proceeds to instruction box 1018 and proceeds with the process of playing the cued selected presentation planner segment and recording that segment on the recording media 970 as indicated in box 1019.

As the planner segment is being recorded, the program also reads the current file profile history, selects the next audio/video segment and cues the next audio/video segment from one of the videodisc players as indicated in boxes 1021 and 1023.

The program then proceeds to decision box 1027 to determine whether the cued presentation segment is the concluding segment. If the segment is not the concluding segment, the program goes to box 1027B which advances the program to box 1051. If it is the concluding segment, the program proceeds to instruction 1027A which advances the program to box 1029.

Figure 1F:
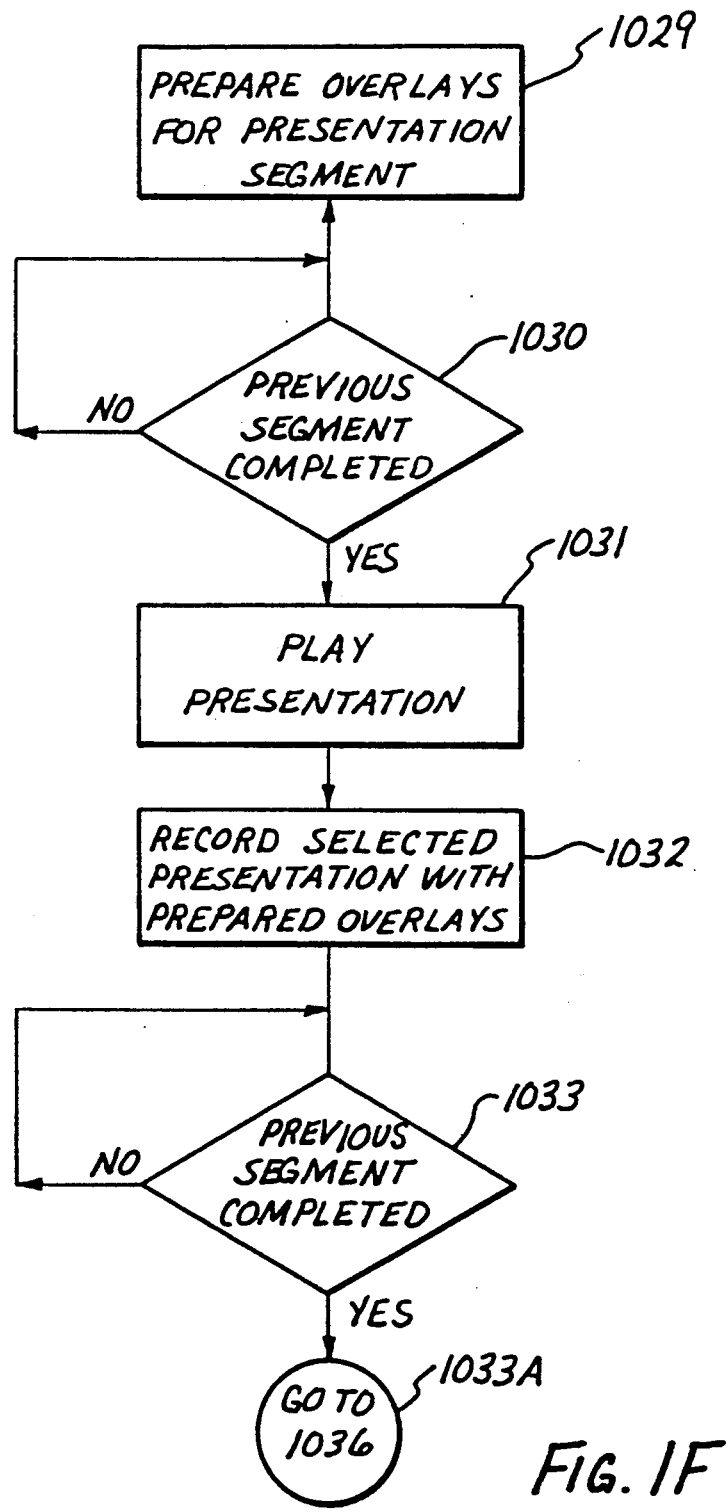
Figure 1G:
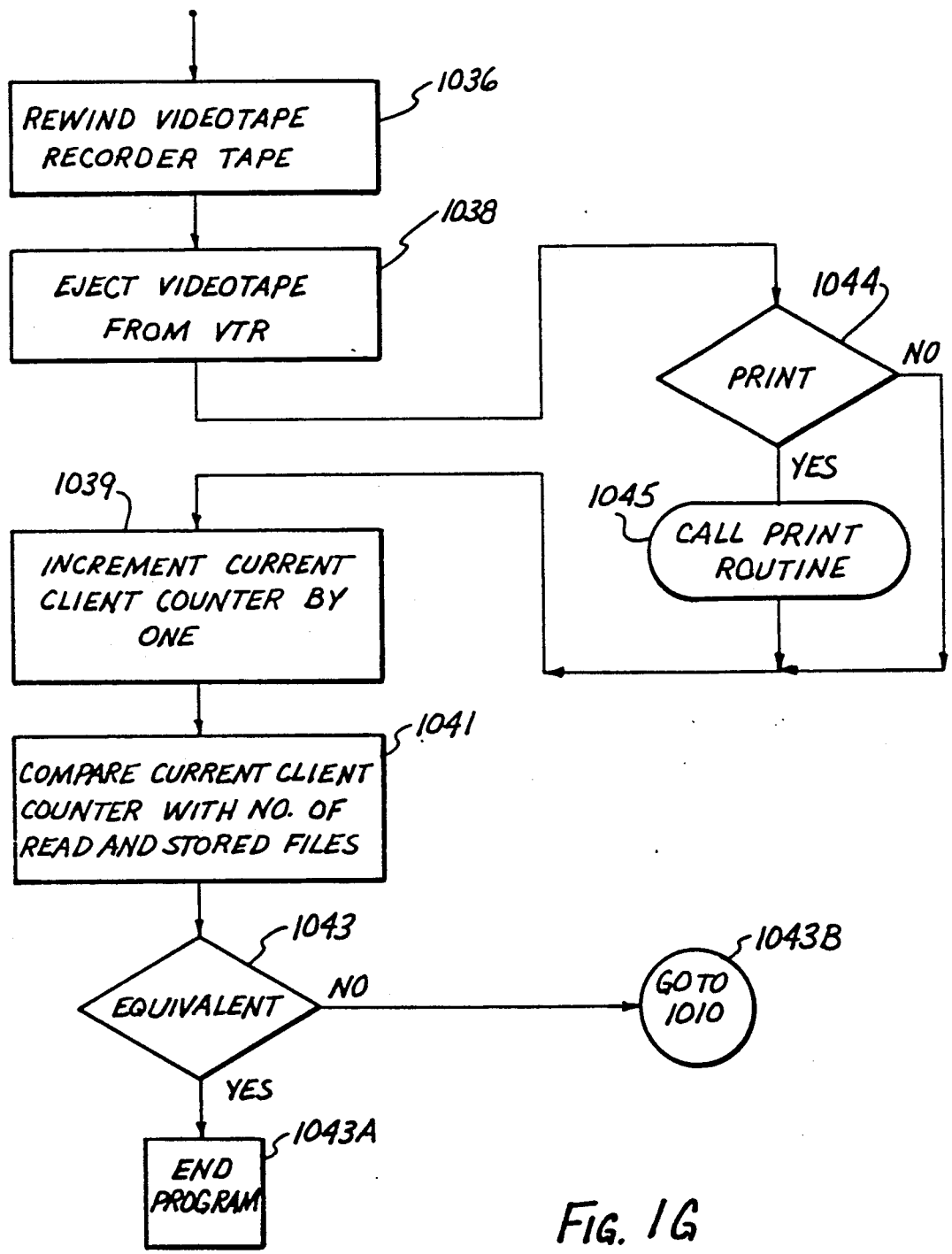
Figure 1H:
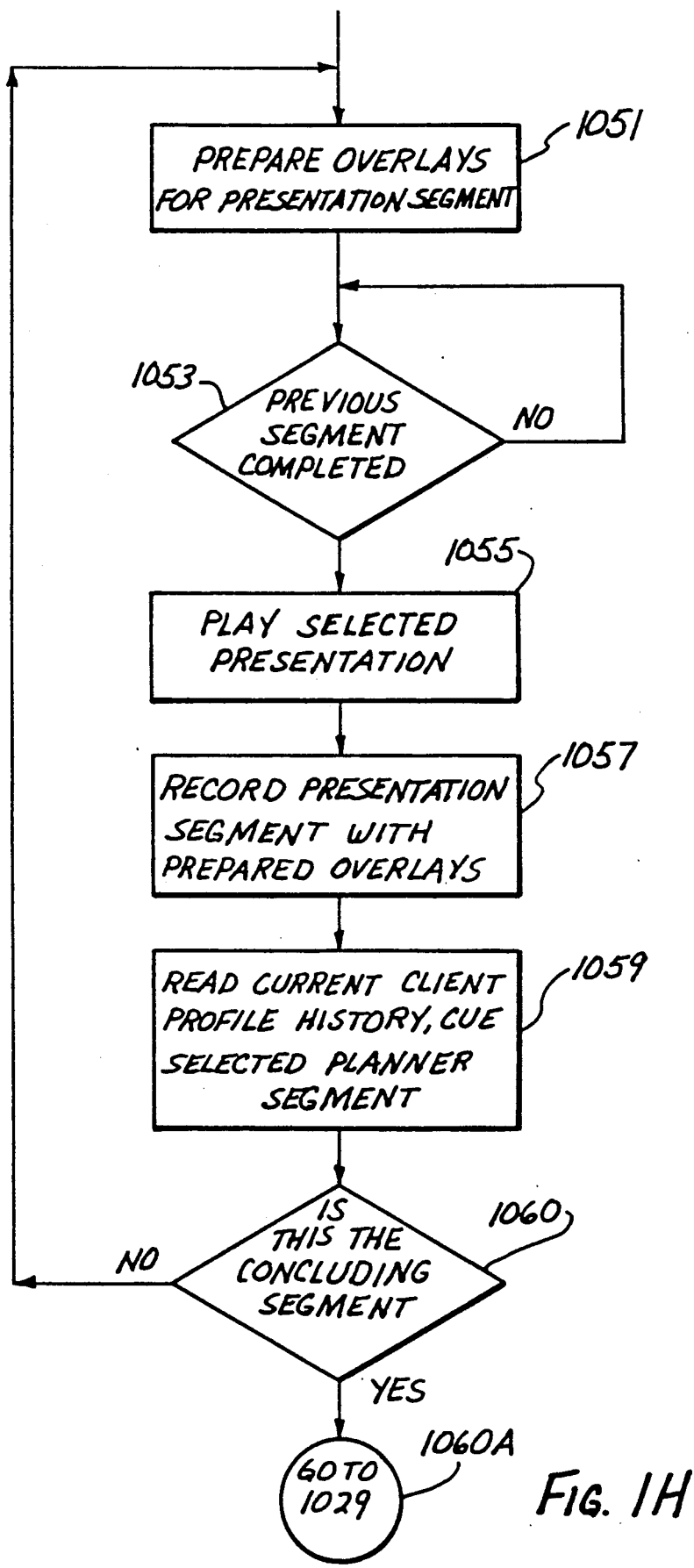

Referring now to FIG. 1F, when the program advances to box 1029 where the program prepares overlays, at box 1030 the program waits for the previous audio/video segment to be recorded. When the planner segment has been recorded, the program proceeds to instruction box 1031 and plays the concluding segment. When the videodisc player plays the concluding segment it is copied and then recorded on the videotape with any prepared overlay as shown in box 1032.

The program then waits for the segment to be recorded as illustrated in box 1033.

Return now to box 1027, if the program determines the cued presentation segment is not the concluding segment the program goes to instruction box 1051 and prepares any necessary overlay for the next presentation segment.

The program then proceeds to decision box 1053 to wait for the previous segment to be recorded. Once the previous segment has been recorded, the program proceeds to box 1055 and plays the selected presentation, records the segment with any prepared overlay box 1057, and cues the player for the next presentation segment (box 1059).

The program then checks in decision box 1060 whether the cued segment is the concluding segment. If it is the concluding segment, the program goes to instruction 1060A which returns the program to box 1029, where it prepares the overlays for the next segment and waits for the previous segment to be recorded at box 1030. When the previous segment has been recorded, the program records the concluding segment with any overlay as indicated in boxes 1031, 1032, and 1033 and then advances to box 1033A.

Once the recording has been completed, the program goes to instruction box 1036 and rewinds the recording media. When the recording media is rewound, the recorder ejects the recording media in box 1038. At decision box 1044 the program determines whether to print any specially sequenced and selected indicia on a media. If indicia is required, the program advances to instruction 1045 which calls a print routine. As the print routine is a standard program, it will not be described. After the document is printed with indicia thereon, such as indicia 75A, the program advances to box 1039. If indicia is not required, the program advances directly to box 1039 and then increments the client counter in box 1039.

After the current client counter has been incremented, the program proceeds to box 1041 and compares the current client counter with the number of client files originally read. If the numbers are equivalent (decision box 1043) the tape production task has been completed and the program ends. If the numbers are not equivalent the program goes to box 1043B which advances the program to decision box 1010.

D. MULTIPLE MEDIA PRODUCTION SYSTEM

Figure 2:
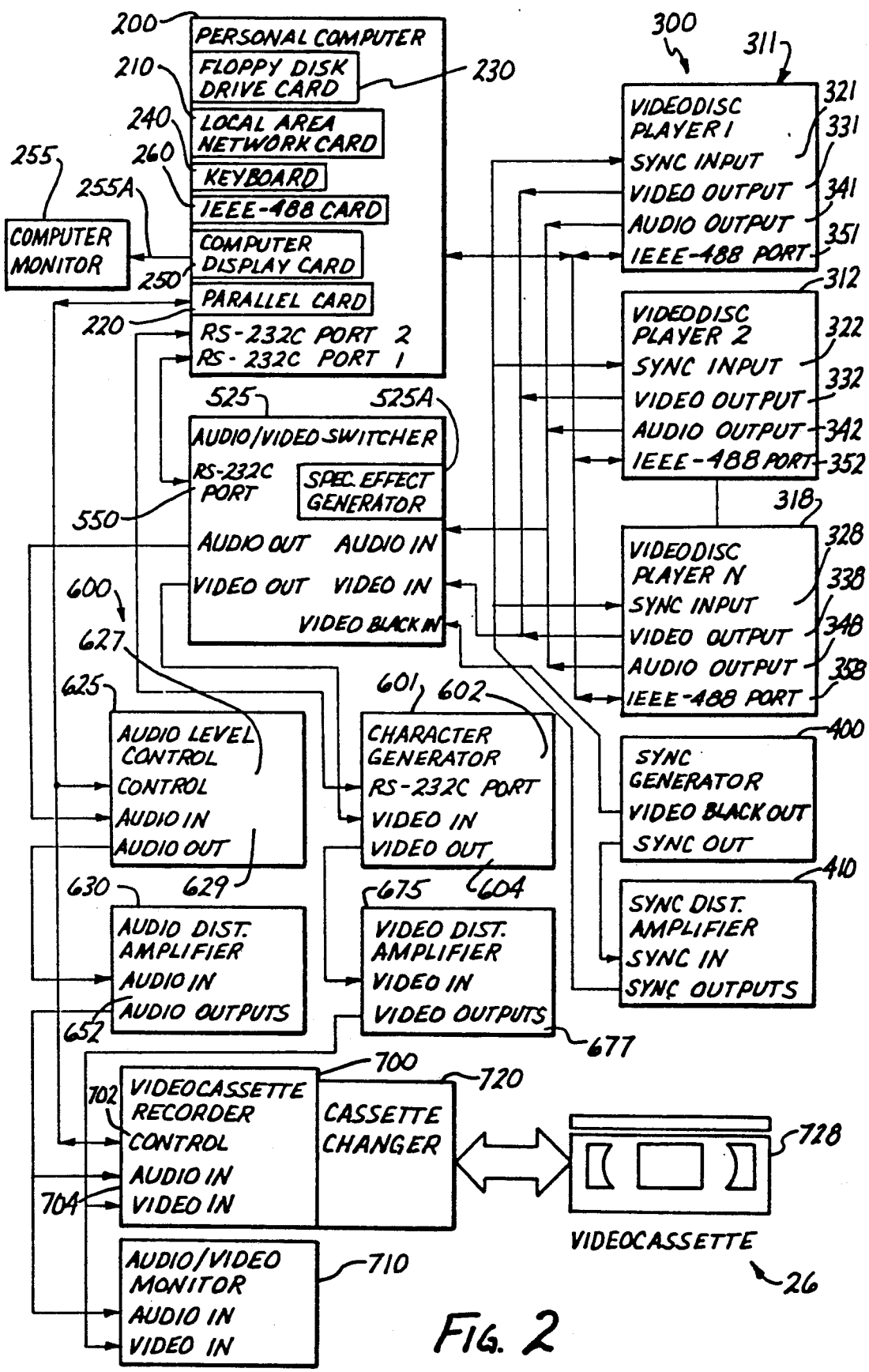
FIG. 2 is a functional block diagram of one of the tape production units of the compiling system shown in FIG. 2A.
Figure 2A:
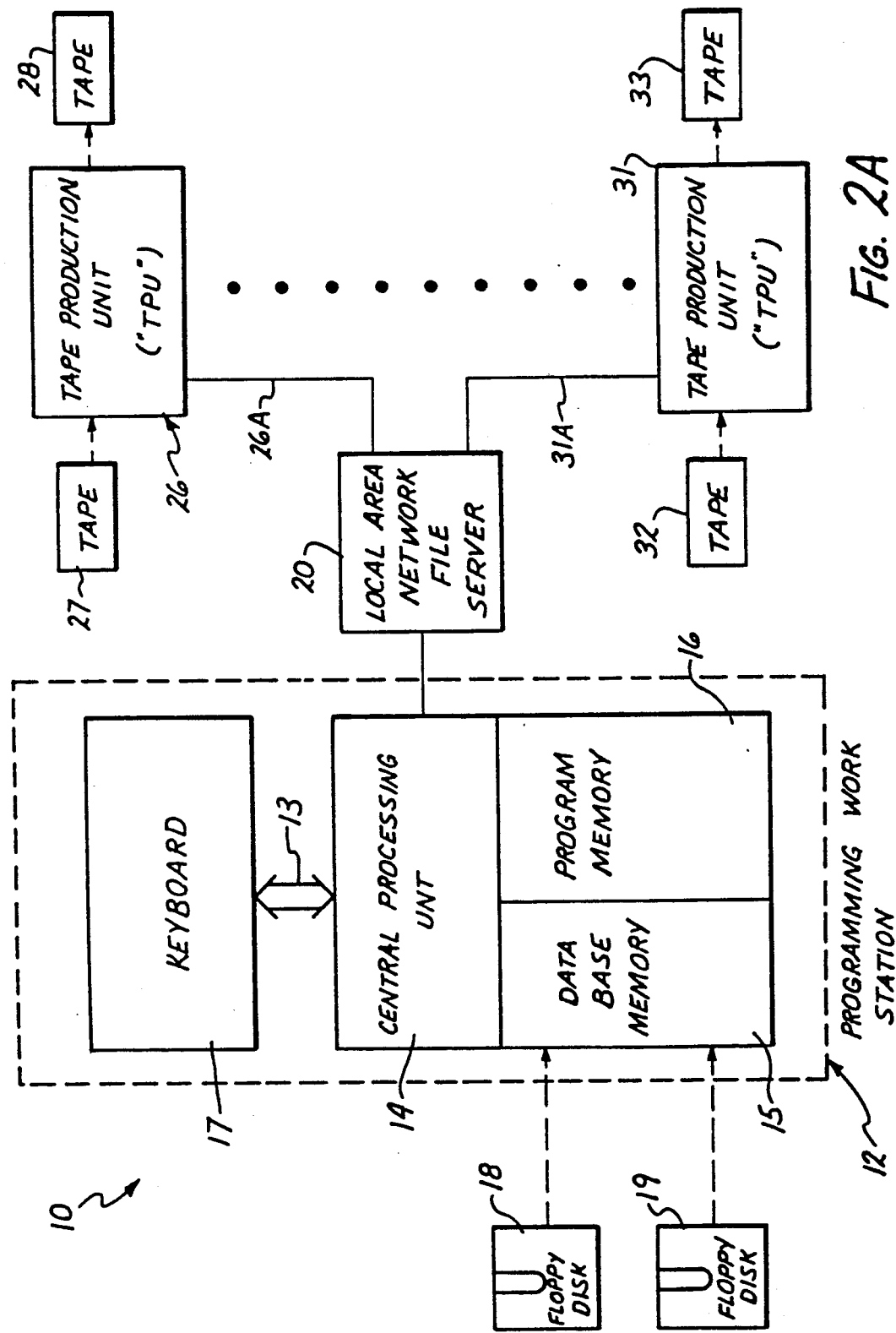
FIG. 2A is a block diagram of another compiling system which is also constructed in accordance with the present invention.

Considering now FIG. 2A, another compiling system 10 for producing several sets of compiled customized recording media simultaneously, is shown and which is also constructed in accordance with the present invention.

The compiling system 10 is comprised of a programming work station 12, a local area network file server 20 and a series of tape production units 26-31.

As best seen in FIG. 2 and 2A, the programming work station 12 consists of a central processing unit 14, a data base memory 15 and a program memory 16. The central processing unit 14 is interconnected to a keyboard 17 by a suitable cable means 13 to provide an input/output path to the central processing unit 14.

The programming work station central processing unit 14 includes a local area network card (not shown) which enables the work station 12 to be interconnected to the local area network file server 20. In operation the central processing unit 14 of the programming work station 12 via its operational program stored in its program memory communicates selectively with the tape production units, such as units 26-31.

Each tape production unit, such as unit 26 includes a local area access card (such as local access card 210 illustrated in FIG. 2) that enables the tape production unit to communicate with the local area network file server 20 which is connected to the central processing unit 14 of the programming work station 12. In this configuration, the programming work station 12 is able to communicate with a series of tape production units, such as units 26-31 so that several sets of compiled customized recording media may be simultaneously produced.

E. TAPE PRODUCTION UNIT

As each tape production unit is substantially similar only tape production unit 26 will be described in greater detail. Considering now tape production unit 26 in greater detail with reference to FIG. 2, tape production unit 26 employs a personal computer generally indicated at 200 such as the model sold by IBM Corporation of New York, under the trade name "IBM PC/XT". It should be apparent to those skilled in the art that other types and kinds of computers may also be employed in accordance with the present invention and that computer 200 is similar to computer 900 previously described herein.

The personal computer 200 includes a microprocessor unit 202, having a local area network card 210, a parallel card 220, a floppy disc drive 230, a keyboard 240, a computer display card 250, and a computer video monitor 255.

The computer video monitor 255 is connected to the computer 200 in a conventional manner via suitable cable means illustrated by line 255A.

The personal computer 200 also includes an IEEE-488 card 260, and a pair of RS-232C cards 270 and 280, respectively. These components are all well known conventional components.

A series of videodisc players 311-318 combine with a sync generator 400, a sync distribution amplifier 410, a audio/video switcher 525 and personal computer 200 to enable computer-control selection of pre-recorded audio/video signals store on a series of videodiscs (not shown). The audio/video switcher 525 includes an internal special effects generator 525A.

A program similar to program 800 stored on a floppy disc (not shown) is used to control operation of the tape production unit 26 to create a recordable composite audio-video segment sequence from the audio-video signals selected from the videodisc players 311-318, graphic and selected from the videodisc players audio information provided by the personal computer 200, and data base information stored on a floppy disc (not shown). In this regard, recipient data base information may also be alpha numeric information and entered into the computer 200.

Videotape recorder 700 then re-records these signals on a suitable recording media such as videocassettes 728, while a composite audio/video monitor 710 enables an operator of the system to monitor the quality of the tape being produced.

As the tape production unit is similar to system S previously described herein, no further detailed description of its hardware will be provided except for where it differs from system S.

Considering now the local area network card 210 in greater detail with reference to FIGS. 2 and 2A, the network card 210 of each tape production unit, such as tape production unit 26 is connected to the local area network file server 20 by a suitable cable means illustrated by lines 26A and 31A. In this manner, each tape production unit has access to the local area network file server 20 so that multiple compiled customized recording media may be prepared simultaneously.

While particular embodiments of the present invention have been disclosed, it is to be understood that various different modifications are possible and are contemplated within the true spirit and scope of the appended claims. There is no intention, therefore, of limitations to the exact abstract or disclosure herein presented.

What is claimed is:

1. An individually customized compiling system for recording information onto storage media devices, comprising:

data base memory means for storing a group of recipient information signals indicative of a group of customized recipient information segments to be compiled selectively;

presentation memory means for storing a group of pre-recorded signals indicative of a group of general information segments to be compiled selectively;

recording means for storing a compiled group of recorded segments customized for a given recipient onto individual ones of the storage media devices, said recorded segments arranged in a predetermined order and including selected segments of said customized recipient information and selected segments of said general information segments;

relational means for causing certain ones of said group of customized information segments to be retrieved from said data base memory for compiling purposes and for selecting which ones of said general information segments are to be compiled therewith;

sequencing means responsive to said relational means for generating a customizing signal indicative of a predetermined order in which the selected ones of said general information segments are to be compiled with said retrieved customized information segments retrieved from said data base memory means;

said recording means responsive to said customizing signal for storing the selected ones of said general information segments and the retrieved customized information segments in said predetermined order onto individual ones of the storage media devices.

2. An individually customized compiling system according to claim 1, wherein said relational means comprises:

a central processing unit for processing said information signals indicative of customized recipient information pertaining to a group of recipients;

relational program memory means for storing processing signals to cause said recording means to store in a certain sequence the customized signals and the selected ones of said pre-recorded signals for facilitating the presentation of product, service, or recommendation information for a selected recipient; and customized recipient data base memory means for storing signals indicative of customized recipient information pertaining to a group of recipients.

3. An individually customized compiling system according to claim 2, further comprising:

segment selector means for helping to facilitate the retrieval of the selected certain ones of said pre-recorded signals indicative of certain ones of said segments.

4. An individually customized compiling system according to claim 3, wherein said segment selector means comprises:

a audio/video switcher for helping selected overlay signals to be integrated with said pre-recorded signals; and synchronizing means for facilitating the synchronization of the pre-recorded signals onto individual ones of the blank storage media devices.

5. An individually customized compiling system according to claim 3, further comprising:
   customizing means responsive to said segment selector means for generating selected ones of said overlay signals and for combining said overlay signals with selected certain ones of said pre-recorded signals pertaining to a given product, service, recommendation or combination thereof.

6. An individually customized compiling system according to claim 5, wherein said customizing means includes means for controlling the audio level
   of the selected ones of said pre-recorded signals for facilitating the presentation of product, service, or recommendation information customized for a selected recipient.

7. An individually customized compiling system according to claim 6, wherein said central processing unit includes means for facilitating the selection of certain ones of said pre-recorded audio and video signals indicative of certain ones of said segments and for causing signals indicative of certain ones of said segments to be retrieved selectively in a given sequence for compilation purposes.

8. An individually customized compiling system according to claim 6, wherein said presentation memory means includes a videodisc player.

9. An individually customized compiling system according to claim 6, wherein said data base memory means is a floppy disc with information signals stored thereon, said information signals being indicative of customized recipient information pertaining to a group of recipients.

10. An individually customized compiling system according to claim 6, wherein said recording means includes videodisc recording means for recording selected ones of said pre-recorded audio and video signals and said customized signals.

11. An individually customized compiling system according to claim 6, wherein said central processing usti includes
   means for receiving said inforamtion signals indicative of customized recipient information pertaining to a group of recipients
   for helping to facilitate the compiling of product, service, or recommendation information customized for a selected recipient.

12. An individually customized compiling system according to claim 11, wherein said means for receiving includes a local area network circuit.

13. An individually customized compiling system according to claim 3, wherein said segment selector means comprises:
   means for causing said signals indicative of certain ones of said segments to be synchronized when retrieved selectively in a given sequence for compilation purposes; and
   customized overlay integrator means responsive to said relational means for integrating signals indicative of computer generated audio and video overlay segments for compilation purposes.

14. An individually customized compiling system according to claim 13, wherein said segment selector means further comprises:
   a audio/video switcher for generating overlay signals to be integrated with said pre-recorded signals.

15. An individually customized compiling system according to claim 13, wherein said customized overlay integrator means comprises:
   graphic and character generator means for generating graphic and character overlay signals for selective integration with said pre-recorded video signal and said computer generated video overlay signals; and
   audio level control means for controlling the audibility level of the pre-recorded audio signals and the computer generated audio overlay segments for compilation purposes.

16. An individually customized compiling system according to claim 1, further comprising:
   printing means for producing indicia bearing media, said indicia being indicative of said customized recipient infromation and the inforamtion content of certain oens of said information segments.

17. A method for compiling individually customized informatin onto blank storage media devices, comprising:
   storing said retrieved segments onto individual ones of the storage media devices.

18. An individually customized storage media device produced in accordance with the process of claim 17.

19. A processing system, comprising:
   a plurality of customized compiling systems for compiling information onto blank storage media devices;
   computing means for selecting certain ones of said compiling systems for compiling information onto blank storage media devices;
   local area network means for enabling the transfer of information between said computing means and individual ones of said plurality of customized compiling systems;
   said computing means including data base memory means for storing a group of recipient information signals indicative of group of customized recipient information segments to be compiled selectively; and
   program memory means for causing certain ones of said group of customized recipient information segments to be retrieved from said data base memory means for compiling purposes and for transferring the retrieved recipient information sequence to selected ones of said compiling systems;
   each one of said compiling systems including recipient memory means for storing the retrieved recipient information segments to be compiled selectively; presentation memory means for storing a group of pre-recorded audio and video signals indicative of a group of audio and video information segments to be compiled selectively; customizing means for selecting desired customer information signals and certain ones of the pre-recorded signals;
   means responsive to said customizing means for retrieving in a given sequence selected ones of said customer information signals and certain ones of said pre-recorded signals for compilation purposes; and recording means responsive to said retrieving means for recording the selected signals onto individual ones of the storage media in said given sequence.

20. A tape production unit for recording information onto blank media, comprising:

analyzing means for selecting target information signals indicative of a recipient;

means responsive to said analyzing means for generating decision signals for selecting product, service, or recommendation information for presentation to a recipient;

presentation memory means for storing a group of pre-recorded information signals indicative of a group of product, service, or recommendation information segments to be compiled selectively;

means responsive to said decision signals for helping to facilitate the retrieval of certain ones of the product, service, or recommendation information segments and for sequencing the information segments for compiling onto the blank media;

means responsive to said decision signals and to said means for helping and sequencing for merging certain ones of said product, service, or recommendation information segments with certain ones of said selected target information signals to form customized information signals; and assembly means for assembling said customized information signals and certain ones of said product, service, or information segments onto individual ones of the blank media units in a seamless continuous manner.

21. A system including a programmed data processor for video marketing a plan, said plan being customized for an individual recipient on a recorded media storage device, said system comprising:

data base means for storing groups of customized input information signals indicative of the personal profile information of groups of selected recipients;

presentation memory means for storing a group of pre-recorded signals indicative of a group of vignettes illustrative of various planning information;

means responsive to said groups of customized input information signals for selecting certain ones of said pre-recorded signals for facilitating the presentation of planning information, said planning information being indicative of a plan with given planning goals and objectives;

recording means for storing said customized input information signals and the selected ones of said prerecorded signals; and switching means responsive to said means for selecting for causing said recording means to store certain ones of said customized input information signals indicative of the personal profile information for a selected recipient, and to store selected ones of said pre-recorded signals corresponding to said plan with given planning goals and objectives in a certain sequence.

22. A system for video marketing according to claim 21, further comprising:

data computer means responsive to said customized input information signals for determining a desired plan with certain objectives and goals structured according to the personal profile information for a selected individual.

23. A system for video marketing according to claim 22, wherein said data computer means includes means for selecting a desired plan with certain objectives and goals structured according to the personal profile information for a selected individual.

24. A system for video marketing according to claim 23, wherein said means for selecting includes means for generating decision signals for facilitating the selection of certain ones of said pre-recorded signals indicative of plans, goals and objective.

25. A system for video marketing according to claim 22, wherein said data computer means includes means for receiving said groups of customized input information 26. A system for video marketing according to claim 21, wherein said presentation memory means includes:

a video disc player means, and said vignettes are audio and motion picture vignettes.

27. A system for video marketing according to claim 21, wherein said recording means includes:

video disc recording means for recording selected ones of said customized input information signals and selected ones of said pre-recorded signals.

28. A system for video marketing according to claim 21, wherein said recording means records said selected ones of said input information signals and selected ones of said pre-recorded signals on a recording media.

29. A system for video marketing according to claim 28 wherein said recording media is a video disc.

30. A compiling system for recording information onto storage media devices, comprising:

recipient memory means for storing a group of customer information signals indicative of personal and idiosyncratic data pertaining to a group of customers;

memory means for storing a group of pre-recorded signals indicative of a group of information segments;

means for determining a desired information segment for presentation to a recipient;

means for retrieving seriatim selected ones of said customer information signals; and recorder means responsive to said means for determining and to said means for retrieving for recording said desired information segment onto individual ones of the storage media devices and for recording a selected one of said customer information signal therewith in a predetermined order at a determined portion of the storage media devices.

31. A compiling system according to claim 30, further comprising:

means for selecting additional video segments for compiling and recording purposes.

32. A compiling system according to claim 30, wherein said pre-recorded signals include audio segments.

33. A compiling system according to claim 30, wherein said pre-recorded signals include graphic and textual overlay segments.

34. A compiling system according to claim 30, wherein said pre-recorded signals include video segments.

35. A compiling system for recording information on storage media devices, comprising:

means for storing variable information signals indicative of variable information segments;

means for storing pre-recorded information signals indicative of a plurality of general information segments;

means for generating decision signals to facilitate the ordering of said plurality of general information segments for recording purposes;

means responsive to said decision signals for selecting desired ones of said general information segments and desired ones of said variable information segments and for arranging said selected information segments in a predetermined order for recording purposes; and recording means for storing said selected information segments automatically onto an individual one of the storage media devices in said predetermined order.

* * * * *

UNITED STATES PATENT AND TRADEMARK OFFICE
CERTIFICATE OF CORRECTION

PATENT NO. : 5,099,422

DATED : March 24, 1992

INVENTOR(S) : R. Scott Foresman, Michael G. Slade, John M. Moscicki
Kathleen B. Keilty, Terence P. Shek It is certified that error appears in the above-identified patent and that said Letters Patent is hereby corrected as shown below: Column 17, line 43, Delete "USti", and Substitute therefor --unit--

Column 18, line 18, delete "inforamtion: and substitute therefor --information--.

Column 20, Line 16, after "28", please insert --,--.

Column 18, line 22, before the new paragraph starting with storing said retrieved segments---" insert the following new paragraph:   --storing a group of recipient information signals indicative of a group of customized recipient information segments to be compiled selectively;
   storing a group of pre-recorded signals indicative of a group of general information segments to be compiled selectively;
      selecting certain ones of said pre-recorded signals indicative of certain ones said general information segments;
     selecting certain ones of said recipient information signals indicative of certain ones of said recipient information segments;
     causing the selected certain ones of said general information segments and the selected certain ones of said recipient information segment to be retrieved selectively in a given sequence for compilation purposes; and--.

Signed and Sealed this

Sixteenth Day of November, 1993

*Attest:*

BRUCE LEHMAN

*Attesting Officer*   *Commissioner of Patents and Trademarks*